United States Patent
Bala et al.

(10) Patent No.: US 6,226,366 B1
(45) Date of Patent: May 1, 2001

(54) SUBSCRIBER-INITIATED AUTOMATED THIRD PARTY BILLING FEATURE

(75) Inventors: Srinivas Bala, Edison; Shaoqing Wang; Robert S. Westrich, both of Middletown, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/477,335

(22) Filed: Jan. 4, 2000

(51) Int. Cl.$^7$ .......................... H04M 15/00; H04M 17/00
(52) U.S. Cl. .......................... 379/114; 379/111; 379/115; 379/127; 379/144
(58) Field of Search .......................... 379/111, 112, 379/114, 115, 121, 127, 144

(56) References Cited

U.S. PATENT DOCUMENTS

| | | | |
|---|---|---|---|
| 5,210,789 | * 5/1993 | Jeffus et al. | 379/127 |
| 5,539,807 | * 7/1996 | Ghisler et al. | 379/58 |
| 5,579,379 | * 11/1996 | D'Amico et al. | 379/112 |
| 5,729,598 | * 3/1998 | Kay | 379/115 |
| 5,754,633 | 5/1998 | Levy | 379/114 |
| 5,774,533 | * 6/1998 | Patel | 379/127 |
| 5,854,975 | * 12/1998 | Fougnies et al. | 455/408 |
| 5,926,535 | * 7/1999 | Reynolds | 379/221 |
| 6,130,935 | * 10/2000 | Shaffer et al. | 379/127 |
| 6,169,891 | * 1/2001 | Gorham et al. | 455/408 |

* cited by examiner

Primary Examiner—Stella Woo
Assistant Examiner—Binh K. Tieu

(57) ABSTRACT

Accordingly to one embodiment of the present invention, a method for providing caller initiated third party billing in a telecommunication system is disclosed. First, a predetermined number is dialed by the subscriber to access the third party billing feature. The subscriber is then prompted to enter proper identification and the telecommunication system authenticates the subscriber identification. Once the subscriber's identification has been authenticated, the system retrieves the subscriber's account information. The system then determines the phone number of the selected telephone the subscriber wants to make calls from. The system then sends the subscriber's account information and the phone number the subscriber wants to make the calls from to a billing server. The billing server then sends the subscriber's account information to a local exchange carrier responsible for the selected telephone. The calls made from the selected telephone are then billed to the subscriber's account.

16 Claims, 2 Drawing Sheets

US 6,226,366 B1

SUBSCRIBER-INITIATED AUTOMATED THIRD PARTY BILLING FEATURE

TECHNICAL FIELD

This invention relates to a technique for allowing a party to charge telephone calls to a telephone other than the one they are using.

BACKGROUND OF THE INVENTION

Currently, when subscribers or callers are traveling, they use calling cards or pre-paid telephone cards if they wish to place phone calls from a different location without their hosts being billed for the telephone call. Alternatively, subscribers call the operator and have the operator manually bill a certain call to the subscriber's account.

SUMMARY OF THE INVENTION

An object of the present invention is to provide a billing feature which enables subscribers to get rid of calling cards and virtually use any phone as their own and get billed only at the subscriber's account.

Accordingly to one embodiment of the present invention, a method for providing caller initiated third party billing in a telecommunication system is disclosed. First, a predetermined number is dialed by the subscriber to access the third party billing feature. The subscriber is then prompted to enter proper identification and the telecommunication system authenticates the subscriber identification. Once the subscriber's identification has been authenticated, the system retrieves the subscriber's account information. The system then determines the phone number of the selected telephone the subscriber wants to make calls from. The system then sends the subscriber's account information and the phone number the subscriber wants to make the calls from to a billing server. The billing server then sends the subscriber's account information to a local exchange carrier responsible for the selected telephone. The calls made from the selected telephone are then billed to the subscriber's account.

BRIEF DESCRIPTION OF THE DRAWINGS

The foregoing summary of the invention, as well as the following detailed description of the preferred embodiments is better understood when read in conjunction with the accompanying drawings, which are included by way of example, and not by way of limitation with regard to the claimed invention:

DETAILED DESCRIPTION

Figure 1:
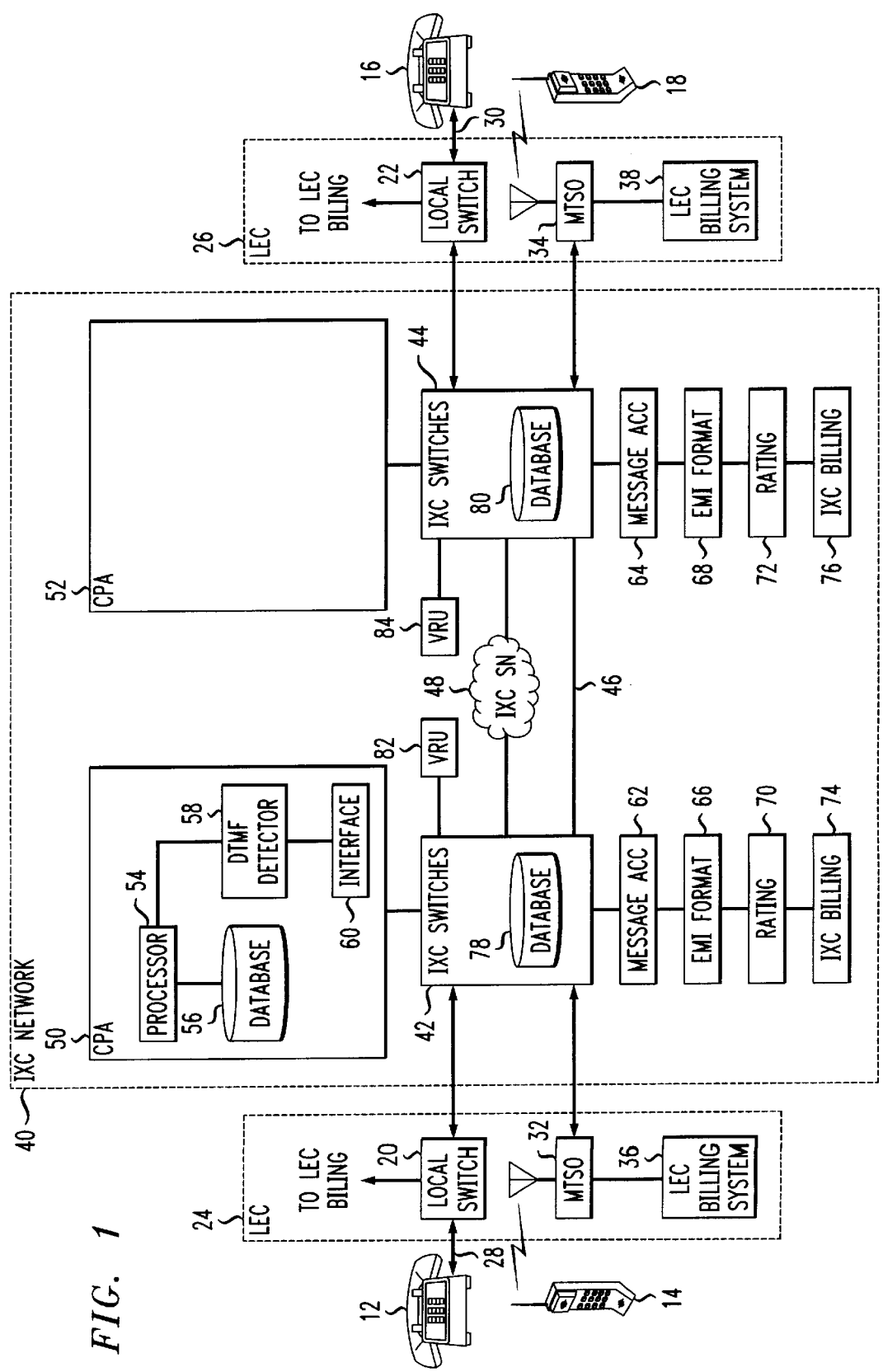
FIG. 1 is an exemplary architecture of a telecommunications network for processing calls in accordance with the present invention.

FIG. 1 depicts an exemplary telecommunication network which can be used in the present invention. The operation of the telecommunication system in general will be briefly described followed by a description of implementing the third party billing feature in the exemplary telecommunications network.

In FIG. 1, the telecommunication network 10 for routing telephone calls among two or more telephones 12, 14, 16 and 18. In the illustrated embodiment, the subscribers 12 and 16 are wire-line subscribers. In other words, each of the telephones 12 and 16 is connected to one of a pair of telephone switches 22 and 24, respectively, associated with one of a pair of Local Exchange Carriers (LECs) 24 and 26, respectively, via wire-lines 28 and 30, respectively. In the illustrated embodiment, the telephones 14 and 18 are wireless telephones. Each of the telephones 14 and 18 can be used to make and receive calls through an individual cell site (not shown) or a succession of cell cites, connected to one of a pair of Mobile Telephone Switching Offices (MTSOs) 32 and 34 associated with the LECs 24 and 26, respectively. Each of the LECs 24 and 26 has billing systems 36 and 38, respectively, coupled to a corresponding one of the switches 20 and 22 and to the MTSOs 32 and 34, respectively. Each of the LEC billing systems 36 and 38 includes a processor and associated data base (not shown) for recording and processing billing information that may be generated by the switch and MTSO of each LEC. Additionally, each of the LEC billing systems 36 and 38 may include one or more printers (not shown) and associated mailing equipment for printing and mailing bills to subscribers.

A call initiated by a subscriber on one of the telephones 12 and 14 served by the LEC 24 and destined for one of the telephones 16 and 18 served by the LEC 26 is carried by an Inter-Exchange Carrier (IXC) network 40, such as the IXC network maintained by AT&T. In the illustrated embodiment, the IXC network 40 includes at least two IXC switches 42 and 44, each typically a No. 4ESS switch previously made by AT&T. The IXC switch 42 serves the local switch 20 and MTSO 32 of the LEC 24 whereas the IXC 44 serves the switch 22 and MTSO 34 of the LEC 26. The IXC switches 42 and 44 are interconnected via at least one trunk 48 across which calls pass between the IXC switches. Additionally, the IXC switches 42 and 44 are linked by an IXC signaling network, such as the SS7 network utilized by AT&T, so that control information can pass between the switches. It should be understood that the IXC network 40 may include one or more switches (not shown) that lie between the switches 42 and 44 for routing calls.

Associated with each of the IXC switches 42 and 44 is one of Call Processing Adjuncts (CPAs) 50 and 52, respectively. The CPAs 50 and 52 provide their respective switches 42 and 44 with certain capabilities beyond those afforded by the switch itself. While the CPAs 50 and 52 are shown separate from the IXC switches 42 and 44, respectively, the capability afforded by each CPA could be integrated within the switch.

The CPAs 50 and 52 are identical. Therefore, only the details of CPA 50 will be described. As seen in FIG. 1, the CPA 50 includes a processor 54 coupled to a data base 56 that stores information as well as certain programs for controlling the operation of the CPA. The CPA 50 also includes a Dual-Tone Multi-Frequency (DTMF) detector 58 coupled to the processor 54. The DTMF detector 58 detects DTMF signals entered subscribers in connection with calls carried by the IXC switch 42. An interface 60 couples the processor 54 to the IXC switch 42 to allow for voice and signaling information to pass between the CPA and the switch. In the illustrated embodiment, the CPA 50 is coupled to the IXC switch 42 via an Integrated Services Digital Network (ISDN) line 58 operating at a Primary Rate Interface (PRI) protocol that provides 23 voice (B) channels and one data (D) channel.

Associated with each of the switches 42 and 44 is one of message accumulators 62 and 64, respectively. Each of the message accumulators 62 and 64 functions to poll its corresponding switch to accumulate billing records created by each switch in connection with calls that is processes. The message accumulators 62 and 64 associated with IXC switches 42 and 44, respectively, are coupled to Electronic Message Interface (EMI) formatters 66 and 68, respectively. Each of the EMI formatters 66 and 68 formats the billing records accumulated by the accumulators 62 and 64, respectively, into industry standard message formats. An example of such an industry standard message format is disclosed in the aforementioned U.S. Pat. No. 5,381,467, which is incorporated herein by reference.

Each of a pair of rating systems 70 and 72 receives the formatted billing records from a corresponding one of the formatters 66 and 68, respectively. Each rating system functions to "rate" each call by computing the appropriate toll charge associated with the call embodied by the just formatted billing record. The toll charge is typically determined in accordance with several factors, including the time-of-day, the original and destination of the call, as well as whether the call was direct-dialed, a credit-card call or was operator assisted.

Each of the rating systems 70 and 72 is coupled to a separate one of a pair of IXC billing systems 74 and 76. The IXC billing systems 74 and 76 are typically similar to the LEC billing systems 36 and 38 and include a processor and data base (not shown) for recording billing information generated by the rating systems 74 and 76, respectively. Each of the IXC billing systems 74 and 76 has the capability of transferring billing information to the LEC billing systems 36 and 38 for the purpose of enabling the LEC billing systems to generate bills for the subscribers 12, 14, 16 and 18 that include the IXC charges incurred by each subscriber. Alternatively, each of the IXC billing systems 74 and 76 may include printers (not shown) as well as mailing equipment (not shown) for directly mailing bills to subscribers of telephones 12, 14, 16 and 18 for any IXC toll charges they may incur.

In the past, when a direct dialed call is initiated on one of the telephones 12 and 14 to one of the telephones 16 and 18, the IXC charges associated with the call were billed to the telephone number of the subscriber making the call. In the illustrated embodiment, the call charges incurred by the telephone 12 were billed by the IXC billing system 74 to the LEC billing system 36.

According to one embodiment of the present invention, a method and apparatus is provided for providing subscriber-initiated automated third party billing feature. The subscriber dials a number to reach an automated system and activates the third party billing feature. After successful authentication, the automated system relays the subscriber account number (the to be billed account number) and the phone number where the subscriber wishes to place calls from, to a billing server, which in turn relays the message to the appropriate local exchange carrier. From that moment on, any calls the subscriber places from the telephone will be billed to the third party the subscriber has chosen.

Figure 2:
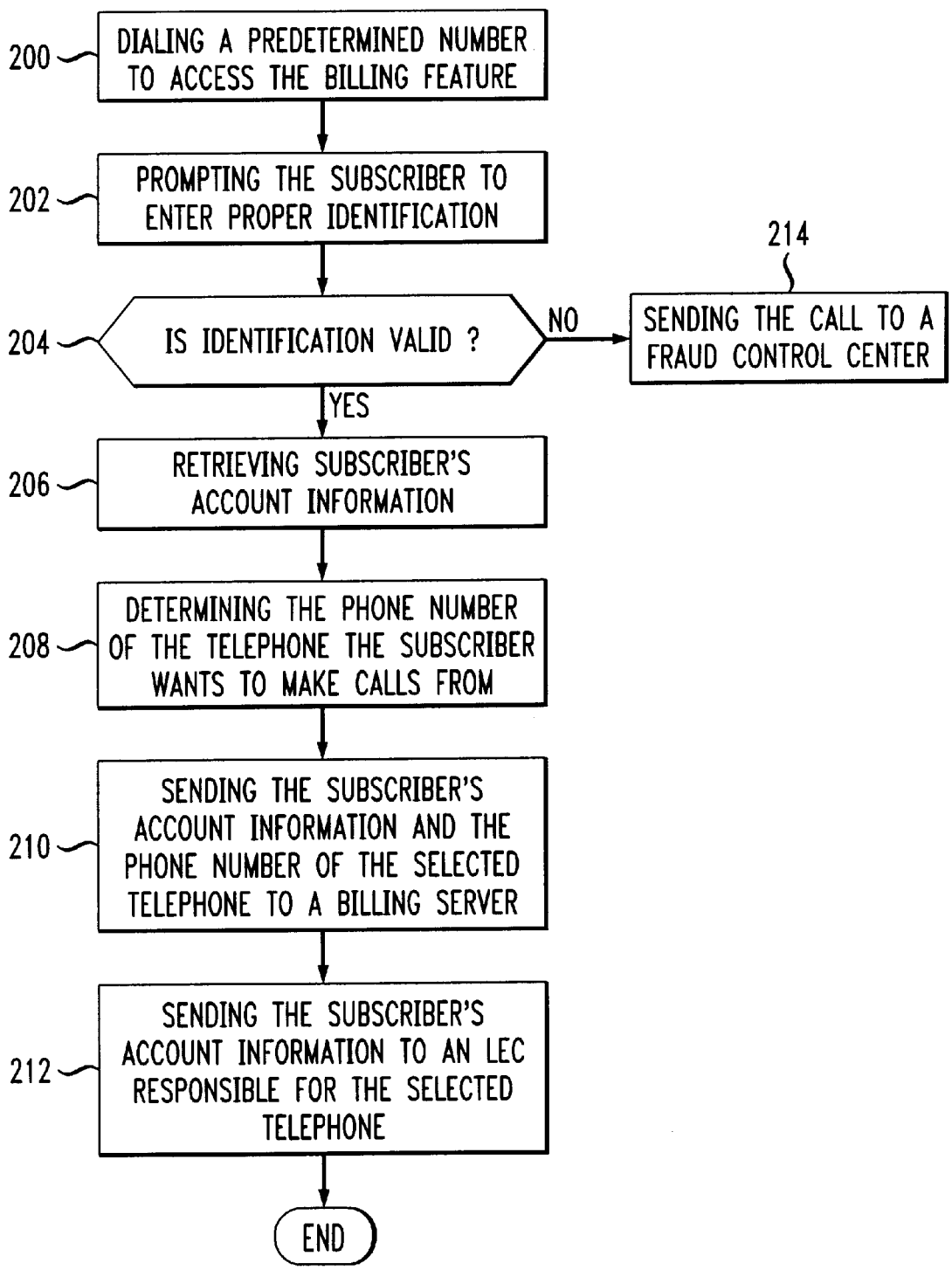
FIG. 2 is a flowchart depicting the operation of the caller initiated third party billing feature according to one embodiment of the present invention.

FIG. 2 illustrates the operation of the third party billing feature according to one embodiment of the present invention. First, the subscriber, for example, for telephone 16 from telephone 12, dials a predetermined number to access the billing feature in step 200. For example, the call is routed through the CPA 50 which controls the third party billing feature, although the control of the billing feature can be located in other parts of the telecommunication system and the present invention is not limited thereto. The telecommunications system prompts the subscriber to enter proper identification or a password in step 202. The subscriber can be prompted by either tone, text or a synthesized voice. Likewise, the subscriber can enter the password or proper identification by either speaking into the telephone or by pressing the appropriate digits on the telephone. Once the identification has been entered by the subscriber, the telecommunication system determines whether or not the identification is valid in step 204. For example, the CPA can check the entered identification with identification information stored in the database 56. If the identification is not valid, the call is terminated. Alternatively, rather than terminating the call, the call can be forwarded to a fraud control center in the telecommunication system in step 214.

If it is determined that the subscriber identification information is valid, the system retrieves the subscriber's account information from a database in step 206. The database, for example, can be the database 56 or the database in the IXC billing system 74 but the invention is not limited thereto. The system then determines the phone number of the telephone that the subscriber wishes to make calls from in step 208. For example, the system may be limited to a scenario in which the selected telephone is the telephone that the subscriber uses when dialing a predetermined number to access the billing feature. In this example, the selected telephone is telephone 12. In this situation, the system can automatically determine the directory and number of the telephone in a known manner. Alternatively, the system can prompt the subscriber to enter the telephone number of the telephone that the subscriber wants to use. Again the subscriber can be prompted by text, tone or a synthesized voice. In turn, the subscriber can enter the telephone number either by voice or by dialing the number on the handset of the telephone. For example, the subscriber for telephone 12 may wish to have calls made from telephone 16 billed to the subscriber's account for telephone 12. The system then sends the subscriber's account information and the selected phone number to a billing server in step 210. The billing server then sends the subscriber's account information to a local exchange carrier which is responsible for handling the selected telephone in step 212. For example, the account information for the subscriber of telephone 12 is sent to the LEC 26 which is responsible for call made from telephone 16. The calls made from the selected telephone and then billed to the subscriber's account number. This feature can remain active until the subscriber re-calls the system to deactivate the billing feature, or alternatively the billing feature deactivates after a determined period of time, a predetermined number of calls, and/or after predetermined amount of money has been billed to the subscriber's account.

Although the present invention has been described in relation to particular preferred embodiments thereof, many variations, equivalence, modifications and other uses will become apparent to those skilled in the art. It is preferred, therefore, that the present invention be limited not by the specific disclosure herein, but only by the appended claims.

We claim:

1. A method for providing caller initiated third party billing in a telecommunications system, comprising the steps of:

dialing a predetermined number to access the third party billing feature;

prompting caller to enter proper identification authenticating caller identification;

retrieving caller's account information;

determining phone number of the selected telephone the caller wants to make calls from;

sending caller's account information and the phone number the caller wants to make calls from to a billing server;

sending caller's account information from the billing server to local exchange carrier responsible for the selected telephone; and billing calls made from said selected telephone to said caller's account.

2. The method according to claim 1, wherein the caller calls the system back to deactivate the billing feature.

3. The method according to claim 1, comprising the step of:

deactivating the billing feature after a predetermined period of time.

4. The method according to claim 1, further comprising the step of:

deactivating the billing feature after a predetermined number of calls.

5. The method according to claim 1, further comprising the step of:

deactivating the billing feature after a predetermined amount of money has been billed to the caller's account.

6. The method according to claim 1, wherein the system prompts the caller to enter the phone number of the telephone the caller wants to use with the billing feature.

7. The method according to claim 1, wherein the selected telephone is the telephone the caller uses to call the predetermined number to access the billing feature.

8. The method according to claim 7, wherein the system automatically determines the phone number of the selected telephone.

9. A system for providing caller initiated third party billing in a telecommunications system, comprising the steps of:

means for dialing a predetermined number to access the third party billing feature;

means for prompting caller to enter proper identification authenticating caller identification;

means for retrieving caller's account information;

means for determining phone number of the selected telephone the caller wants to make calls from;

means for sending caller's account information and the phone number the caller wants to make calls from to a billing server;

means for sending caller's account information from the billing server to local exchange carrier responsible for the selected telephone; and means for billing calls made from said selected telephone to said caller's account.

10. The system according to claim 9, wherein the caller calls the system back to deactivate the billing feature.

11. The system according to claim 9, further comprising:

means for deactivating the billing feature after a predetermined period of time.

12. The system according to claim 9, further comprising:

means for deactivating the billing feature after a predetermined number of calls.

13. The system according to claim 9, further comprising:

means for deactivating the billing feature after a predetermined amount of money has been billed to the caller's account.

14. The system according to claim 9, wherein the system prompts the caller to enter the phone number of the telephone the caller wants to use with the billing feature.

15. The system according to claim 9, wherein the selected telephone is the telephone the caller uses to call the predetermined number to access the billing feature.

16. The system according to claim 15, wherein the system automatically determines the phone number of the selected telephone.

* * * * *